United States Patent [19]
Cable et al.

[11] 3,713,637
[45] Jan. 30, 1973

[54] PORTABLE FLAME CUTTING MACHINE

[75] Inventors: H. Edward Cable, Thornburg; Herbert E. Cable, Mount Lebanon Township; John A. Cable, Moon Township, all of Allegheny County, Pa.

[73] Assignee: Weld Tool Corporation

[22] Filed: Jan. 5, 1971

[21] Appl. No.: 103,985

[52] U.S. Cl. ............................ 266/23 M, 266/23 K
[51] Int. Cl. ............................................. B23k 7/00
[58] Field of Search .....266/23 F, 23 HH, 23 K, 23 L, 266/23 M; 239/587

[56] References Cited

UNITED STATES PATENTS

| | | | |
|---|---|---|---|
| 1,867,047 | 7/1932 | Anderson | 266/23 HH |
| 2,381,355 | 8/1945 | Laughton | 266/23 K |
| 2,492,526 | 12/1949 | Geibig | 266/23 T |
| 2,474,153 | 6/1949 | Livesay | 266/23 K |
| 1,176,584 | 3/1916 | Madgett | 266/23 HH |
| 2,373,541 | 4/1945 | Chelborg et al | 266/23 M |
| 3,328,555 | 6/1967 | Dinter | 266/23 K |
| 1,222,319 | 4/1917 | Mueller | 239/587 |
| 2,424,286 | 7/1947 | Robbins | 266/23 HH |
| 3,608,878 | 9/1971 | Dreshman | 266/23 K |

Primary Examiner—Gerald A. Dost
Attorney—Buell, Blenko & Ziesenheim

[57] ABSTRACT

A portable flame cutting machine which includes an elongated guideway or base rail with rack upon which a carriage is driven and supported. The carriage carrying an auxiliary rail with rack movable perpendicularly to the base rail and carrying a laterally adjustable or movable torch holder for mounting a torch having a universally pivotable torch tip. The carriage contains a pair of drive units operably connected to the guideway rack and the auxiliary rail rack, and optionally a third lateral drive unit.

6 Claims, 2 Drawing Figures

INVENTORS
H. Edward Cable,
Herbert E. Cable and
John A. Cable

PORTABLE FLAME CUTTING MACHINE

Our invention relates to a flame cutting machine and, in particular, to a portable cutting, trimming and detailing machine for structural metal shapes.

Our novel cutting machine overcomes many of the inherent disadvantages of the prior art apparatus. For the most part, the flame cutting tools of the prior art were improvised for a particular type of work, for exampple, bevelling, cutting, detailing, etc. These tools were not adaptable to a varied work pattern without modification and change. Furthermore, these machines were not portable in the sense that a workman could easily pick the tool up and move to another work area. They lacked the ability to be easily aligned for accurate work and necessitated time consuming aligning procedures.

We provide a flame cutting machine that is both portable and easily accurately aligned. Our tool provides accurate self-alignment as well as being adaptable to a variety of different work products.

Generally, we provide a tool with a horizontal track means which is adapted to rest upon a structural work piece. The track means includes a self-aligning clamping mechanism to both secure and align the tool to the structural member. A carriage member is provided that is self-propelled along the length of the track means which supports the carriage as well as provides the guideway along which it moves. The carriage includes an auxiliary track which is movable by means of a drive unit contained within the carriage. A torch boom is provided which includes a horizontally positionable torch mount and an optional power unit for this motion and a universally pivotable torch tip. The torch boom is securely mounted to the auxiliary track for vertical movement with relation to the structural member.

Our novel tool provides both vertical and horizontal movements of the torch along a structural member. The machine is self-propelled and requires a minimum of man-time to operate. Other advantages of our invention will become apparent upon a perusal of the following detailed description taken in connection with the accompanying drawings in which.

Figure 1:
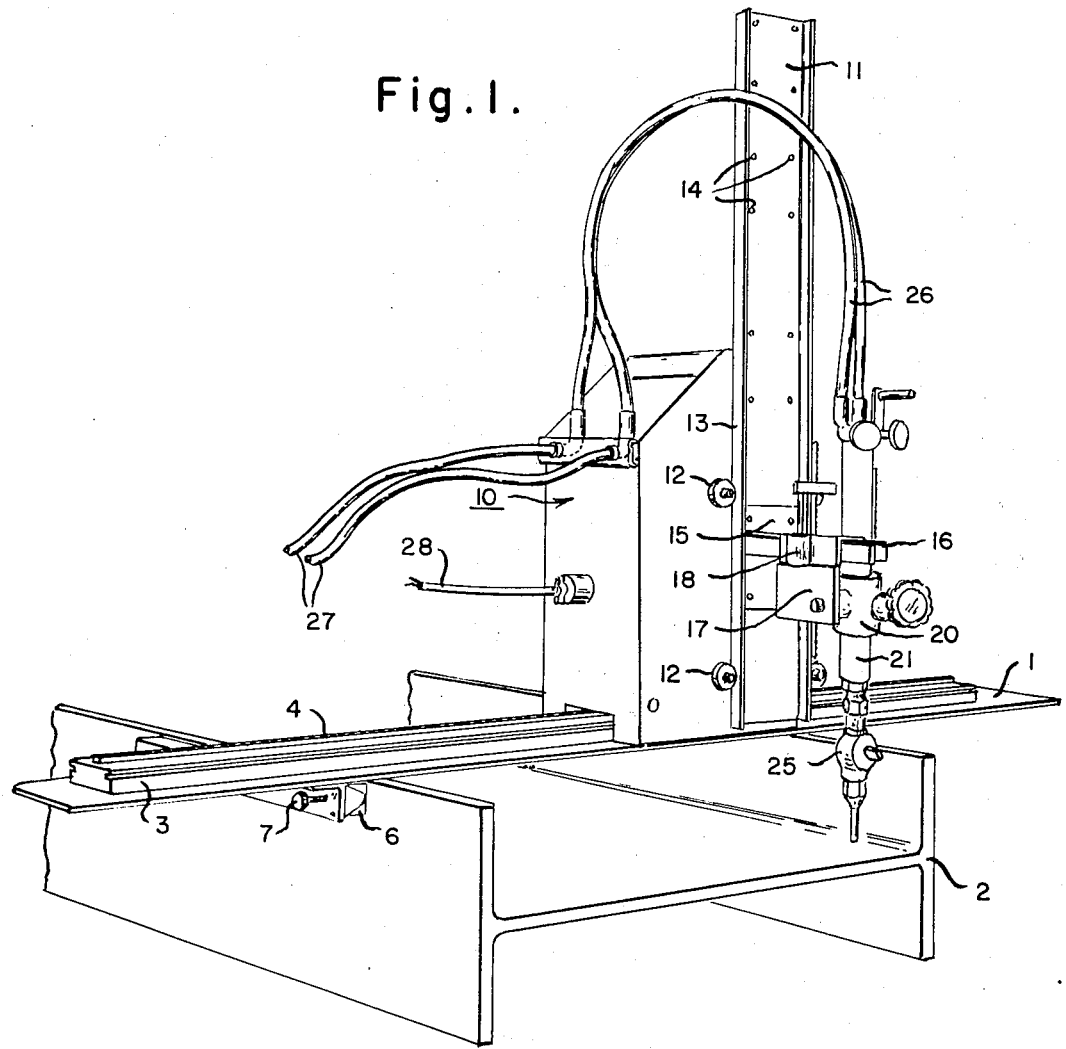
FIG. 1 is a perspective view of our flame cutting tool.

Referring to the drawings, our tool includes a horizontal track support unit 1 which is positionable upon a structural work piece 2. Support unit 1 includes a track or rail 3 mounted thereon which extends substantially the length of the support. Track 3 can be a channeled member which is made of the same material as support unit 1, preferably a strong light alloy. Mounted along the top of rail 3 and extending the length thereof is a gear rack 4.

On the underside of support unit 1 near one of the ends is a clamping means 6. Clamping means 6 provides accurate alignment of the support with relation to structural member 2. To provide alignment other than 90° with respect to the length of the work piece, an angular adjusting screw 7 is provided for visually and accurately setting an angle. We prefer that clamping means 6 incorporates either a permanent or electromagnet system 8 or vacuum holding system. Either of these devices will provide the required degree of stability against vibration and shock which are usually found in a work shop. Both the magnetic and vacuum system provide a high degree of speed and accuracy for securing and aligning that is necessary to eliminate man hours involved in a particular job.

Figure 2:
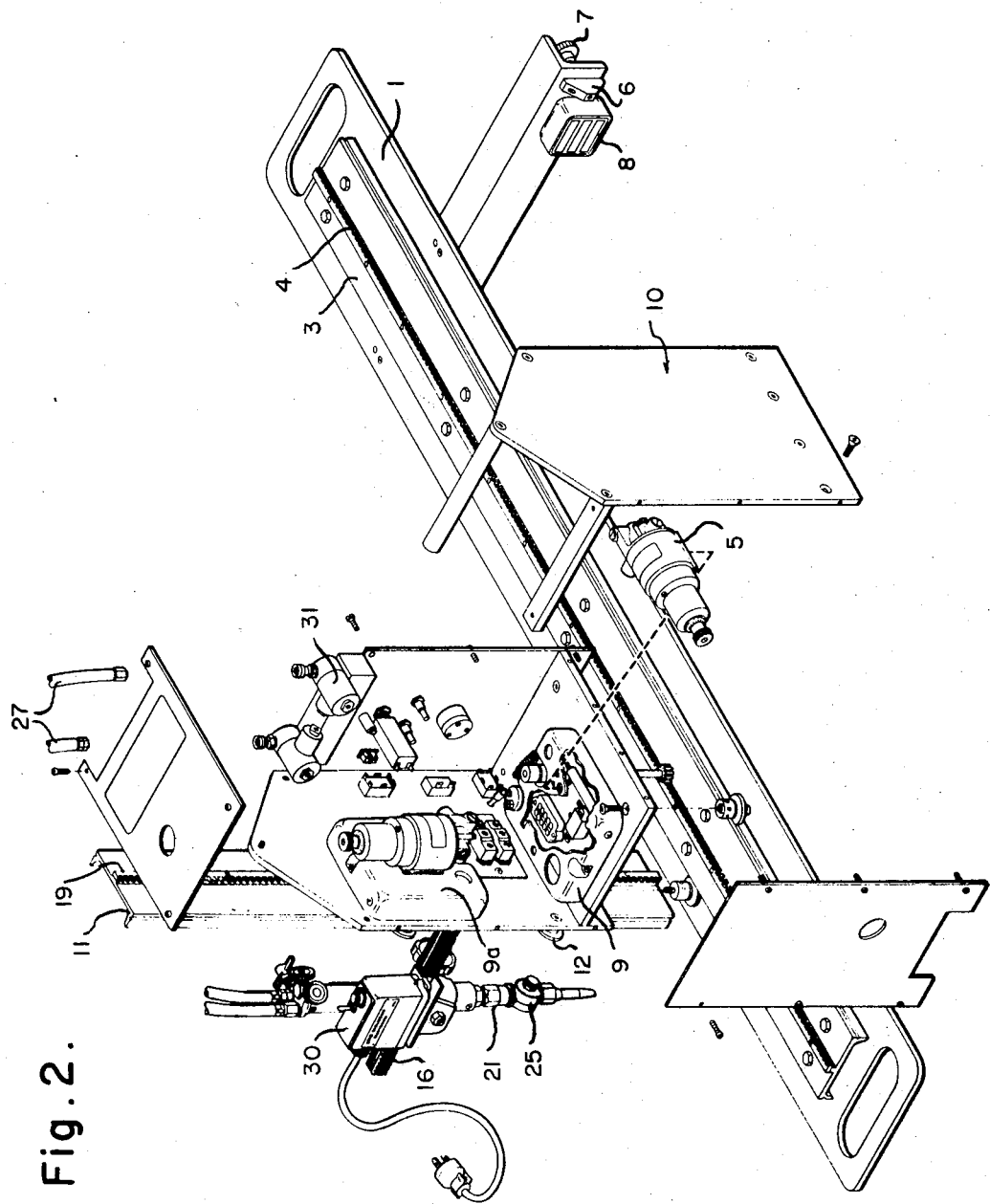
FIG. 2 is an exploded view of the tool shown in FIG. 1 and having an optional drive unit.

We provide a carriage 10 made of a strong light alloy, such as aluminum, that is designed to operate upon rail 3. Carriage 10 incorporates first drive unit 11a and second drive unit 5 and power transfer means which include rack engaging pinion and reduction gears 9 and 9a arranged in any well known manner such as shown in FIG. 2. An auxiliary or second rail 11 is movably mounted to the side of carriage 10 by means of rotatable guides 12. Guides 12 cooperate with guideway 13 machined along opposing edges of the track. Positioned on the back of rail 11 is a gear rack 19 which is similar to rack 4.

The first drive unit and gear transfer means 11a is operably connected to the rack of the auxiliary rail. The first drive unit is arranged in any manner well known to the art. For example an electric motor mounted to one of the carriage sides is connected to a set of speed reducing gears which are in gear train with a pinion operably connected to engage the rack of the rail 11.

A second drive and power transfer unit 5 is set up in a manner similar to the first and is operably connected with rack 4. The second drive provides the horizontal and transfer motion to the carriage.

Rail 11 includes a plurality of mounting holes 14 for receiving at a variety of locations along the rail, boom rack 16. Boom rack 16 includes a perpendicular mount 15 which has holes adapted to align with holes 14. Mount 15 is preferably sized to securely fit within rail 11 so as to position rack 16 perpendicularly to the rail as well as the support unit. A torch mounting sleeve 17 mounts on rack 16 and includes a hand turnable pinion arrangement 18. Sleeve 17 is, therefore, movable along the length of rack 16 by simply turning pinion arrangement 18. Sleeve 17 includes a clamping means 20 which is adapted to securely hold a torch 21. Alternately, an optional gear motor 30, FIG. 2, will power this motion. Torch 21 is provided with a universally pivotable torch tip 25. Torch 21 is connected to the carriage gas manifold with solenoid valves by means of hoses 26 and from the carriage to the gas supply by means of hoses 27. Hoses 27 are preferably connected to manifold block 31 located at the top of carriage 10 to obviate any gas leakage accumulation problems. The drive units are electrically connected to a source of power by means of power cord 28.

As can be seen from the above disclosure, our tool provides a very easy and accurate method of cutting a work piece. The tool is positioned across the structural member and aligned by simply permitting the magnetic or vacuum clamping means to afix itself to the flange of the work piece. The carriage is placed at a point along the support at which the work is to begin. The torch tip is positioned by movement of the auxiliary rail, the boom rider and the universal pivot. If a flange is to be cut, the first drive unit is set in motion at any of an infinite number of preselectable speeds to cause the rail to move in the vertical direction. The torch flame is turned on and the cutting will take place in a uniform and optimal rate. If the webb is to be cut, then the carriage is set in motion by operating the second drive unit along the support. The controls for both the motors and for torch are standard off-the-shelf items.

While we have shown one presently preferred embodiment of our invention, it may be otherwise embodied within the scope of the appended claims.

We claim:

1. A portable flame cutting machine comprising:
   A. an elongated support having a first rail substantially the length of said support and a clamping means for aligning and securing the support to a work piece;
   B. a carriage adapted for movement along said first rail and support and having
      a. first and second drive means, said second drive being disposed to move said carriage;
      b. a second rail operably connected to said first drive means for moving said second rail in a substantially vertical plane, said second rail having mounted thereon a torch mount boom transverse thereto, a torch mount on said boom adapted for movement in a direction transverse to both said second rail and said support;
      c. a torch removably secured to said mount and including a pivotable torch tip; and
      d. drive means on the torch mount for moving said mount lengthwise of said boom.

2. A machine as set forth in claim 1 wherein said first rail includes a gear rack that cooperates with said second drive means.

3. A machine as set forth in claim 1 wherein said clamp comprises one of an electromagnet, permanent magnet and vacuum cup.

4. A machine as set forth in claim 1 wherein said carriage includes at least two pairs of rotatable guides adapted to cooperate with said rail for carrying said second rail.

5. A machine as set forth in claim 1 wherein said second rail includes a gear rack that cooperatively engages said first drive means.

6. A machine as set forth in claim 1 wherein the torch mount includes a boom rack and manual and electric powered pinion moving said mount perpendicularly to said second rail and support.

* * * * *